(12) United States Patent
McBeath et al.

(10) Patent No.: US 8,228,850 B2
(45) Date of Patent: Jul. 24, 2012

(54) METHOD AND APPARATUS FOR TRANSMITTING CONTROL INFORMATION IN A SYSTEM WITH NEW AND LEGACY MOBILE STATIONS

(75) Inventors: Sean Michael McBeath, Keller, TX (US); Anthony C. K. Soong, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 850 days.

(21) Appl. No.: 12/260,374

(22) Filed: Oct. 29, 2008

(65) Prior Publication Data

US 2009/0109914 A1  Apr. 30, 2009

Related U.S. Application Data

(60) Provisional application No. 60/983,841, filed on Oct. 30, 2007.

(51) Int. Cl.
    *H04W 4/00* (2009.01)
(52) U.S. Cl. ...................................................... 370/329
(58) Field of Classification Search ........................ None
    See application file for complete search history.

(56) References Cited

U.S. PATENT DOCUMENTS

| | | | | |
|---|---|---|---|---|
| 2006/0195767 A1* | 8/2006 | Ihm et al. | ........................ | 714/776 |
| 2008/0095195 A1* | 4/2008 | Ahmadi et al. | ................ | 370/478 |
| 2008/0117867 A1* | 5/2008 | Yin et al. | ........................ | 370/329 |
| 2008/0159323 A1* | 7/2008 | Rinne et al. | ..................... | 370/431 |
| 2009/0067377 A1* | 3/2009 | Talukdar et al. | ............... | 370/329 |

OTHER PUBLICATIONS

Part 16: Air Interface for Broadband Wireless Access Systems, P802.16Rev2/D6, Jul. 2008, pp. 718-721.
"The Draft IEEE 802.16m System Description Document," IEEE 802.16 Broadband Wireless Access Working Group, Jul. 29, 2008. pp. 1-88.

* cited by examiner

*Primary Examiner* — Yong Zhou
(74) *Attorney, Agent, or Firm* — Slater & Matsil, L.L.P.

(57) ABSTRACT

A method of transmitting control information to new and legacy mobile stations in a wireless communications system is disclosed. In one embodiment, a method and apparatus for the base station to transmit control information in a system with new and legacy mobile stations is disclosed. In another embodiment, a method and apparatus for the mobile station to transmit control information is disclosed.

18 Claims, 13 Drawing Sheets

METHOD AND APPARATUS FOR TRANSMITTING CONTROL INFORMATION IN A SYSTEM WITH NEW AND LEGACY MOBILE STATIONS

The application claims the benefit of provisional application Ser. No. 60/983,841, filed Oct. 30, 2007 and incorporated herein by reference.

TECHNICAL FIELD

This invention relates generally to communication systems and, in particular embodiments, to a method and apparatus for transmitting control information in a system with new and legacy mobile stations.

BACKGROUND

As wireless communications systems continues to evolve, new wireless communications systems are being developed which must be backward compatible with legacy wireless communications system. The level of backward compatibility depends on the system requirements and can relate to control channels, time domain structure, frequency domain structure, signaling messages, feedback messages, synchronization channels, and the like.

In order to make new wireless communication systems as efficient as possible, it is often desirable to limit the number of features from the legacy system that will be carried forward to the new system. Further, at some point in the future, it may be desirable to discontinue support for the legacy devices, therefore eliminating the backward compatibility requirement.

The time domain structure of a legacy wireless communication system is the most common area where backward compatibility must be maintained. The time domain structure of a wireless communication system is tightly coupled with the delay associated with hybrid automatic repeat request (H-ARQ) transmissions. The delay associated with H-ARQ transmissions for new mobile stations must be less than or equal to the delay associated with H-ARQ transmissions for legacy mobile stations. Thus, there is a need for reducing the delay associated with H-ARQ transmissions for new mobile stations, while maintaining the time domain structure of the legacy system.

SUMMARY OF THE INVENTION

In various embodiments, the present invention relates to the transmission of control information in a wireless communication system. In more specific embodiments, the present invention relates to a novel method of transmitting control information in orthogonal frequency division multiplexing (OFDM) and orthogonal frequency division multiple access (OFDMA) communication systems when there are both new and legacy mobile stations.

In various aspects this invention provides an efficient way of transmitting control information in a system where there are both new and legacy mobile stations. The invention discusses extended frames, HARQ timing, control location, and subcarrier permutations. In one embodiment, a new feature is the division of the time domain into mini frames, wherein a particular control relationship is defined.

In one aspect, the present invention provides a method and apparatus for the base station to transmit control information in a system with new and legacy mobile stations.

In another aspect, the present invention provides a method and apparatus for the mobile station to transmit control information in a system with new and legacy mobile stations.

In a first embodiment of the present invention, a method of transmitting control information to new and legacy mobile stations in a wireless communications system is disclosed. The method includes dividing a frame into at least three mini frames, wherein the mini frames repeat periodically; designating at least two of the at least three mini frames as downlink mini frames, denoting the concatenation of all downlink mini frames as the downlink subframe; designating at least one of the at least three mini frames as an uplink mini frame, denoting the concatenation of all uplink mini frames as the uplink subframe; designate a legacy control region, wherein the legacy control region occurs in each occurrence of the downlink subframe; designating a new downlink control region in at least one of the at least two downlink mini frames; designating a new uplink control region in at least one of the at least one uplink mini frames; transmitting an indication of the designated downlink and designated uplink mini frames to the new mobile stations; transmitting control information to the legacy mobile stations in the legacy control region; and transmitting control information to the new mobile stations in the new downlink control region.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In various embodiments, the present invention provides a unique method and apparatus for transmitting control information in a system with new and legacy mobile stations. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

Figure 1:
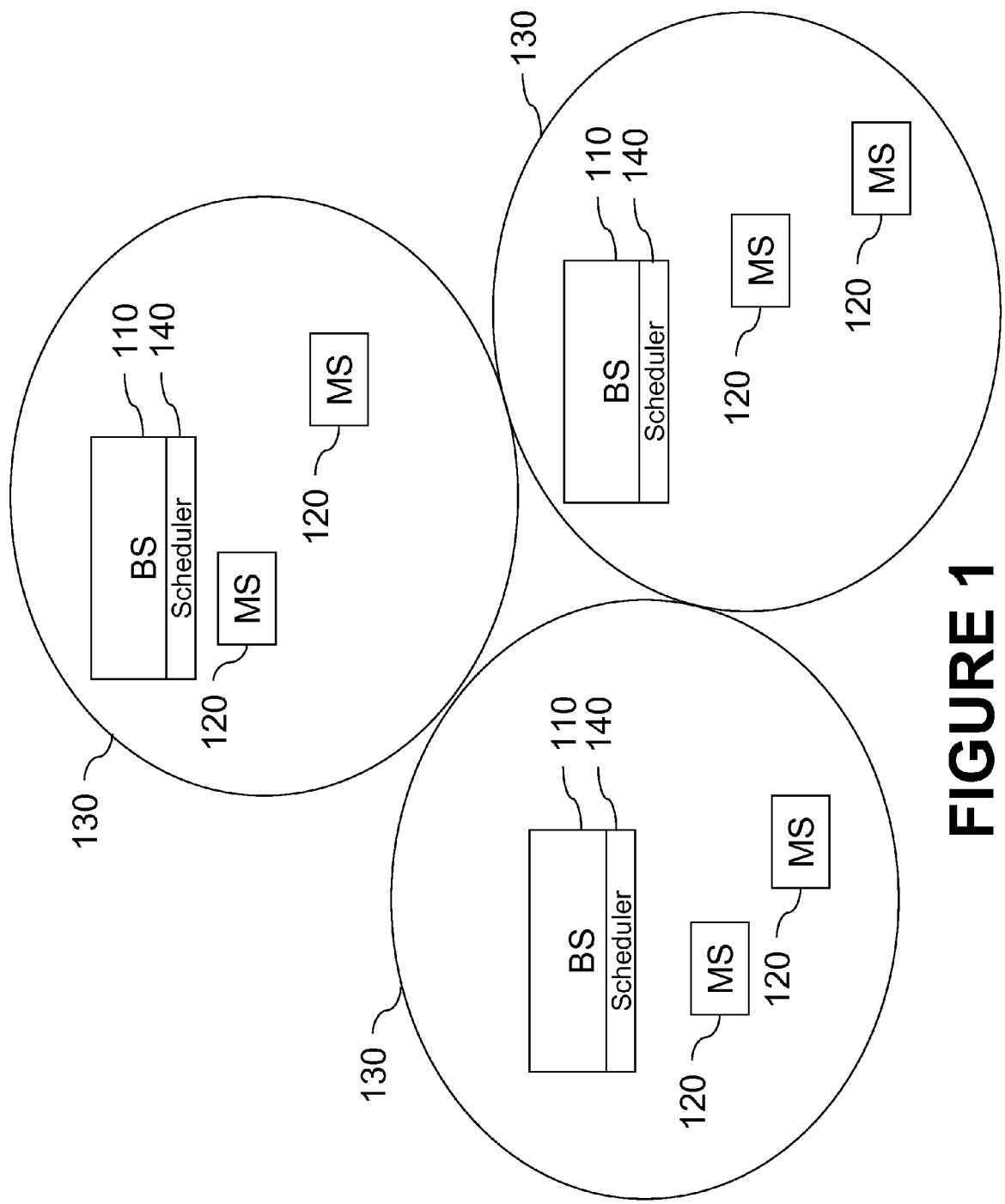
FIG. 1 illustrates a wireless communications network.

FIG. 1 illustrates a wireless communications network comprising a plurality of base stations (BS) 110 providing voice and/or data wireless communication service to a plurality of mobile stations (MS) 120. The BS is also sometimes referred to by other names such as access network (AN), access point (AP), Node-B, and others. Each BS has a corresponding coverage area 130.

Referring to FIG. 1, each base station 110 includes a scheduler 140 for allocating radio resources to the mobile stations. Exemplary wireless communication systems include, but are not limited to, Evolved Universal Terrestrial Radio Access (E-UTRA) networks, Ultra Mobile Broadband (UMB) networks, IEEE 802.16 networks, and other OFDMA based networks. In some embodiments, the network is based on a multiple access scheme other than OFDMA. For example, the network can be a frequency division multiplex access (FDMA) network wherein the time-frequency resources are divided into frequency intervals over a certain time interval, a time division multiplex access (TDMA) network wherein the time-frequency resources are divided into time intervals over a certain frequency interval, and a code division multiplex access (CDMA) network wherein the resources are divided into orthogonal or pseudo-orthogonal codes over a certain time-frequency interval.

Figure 2:
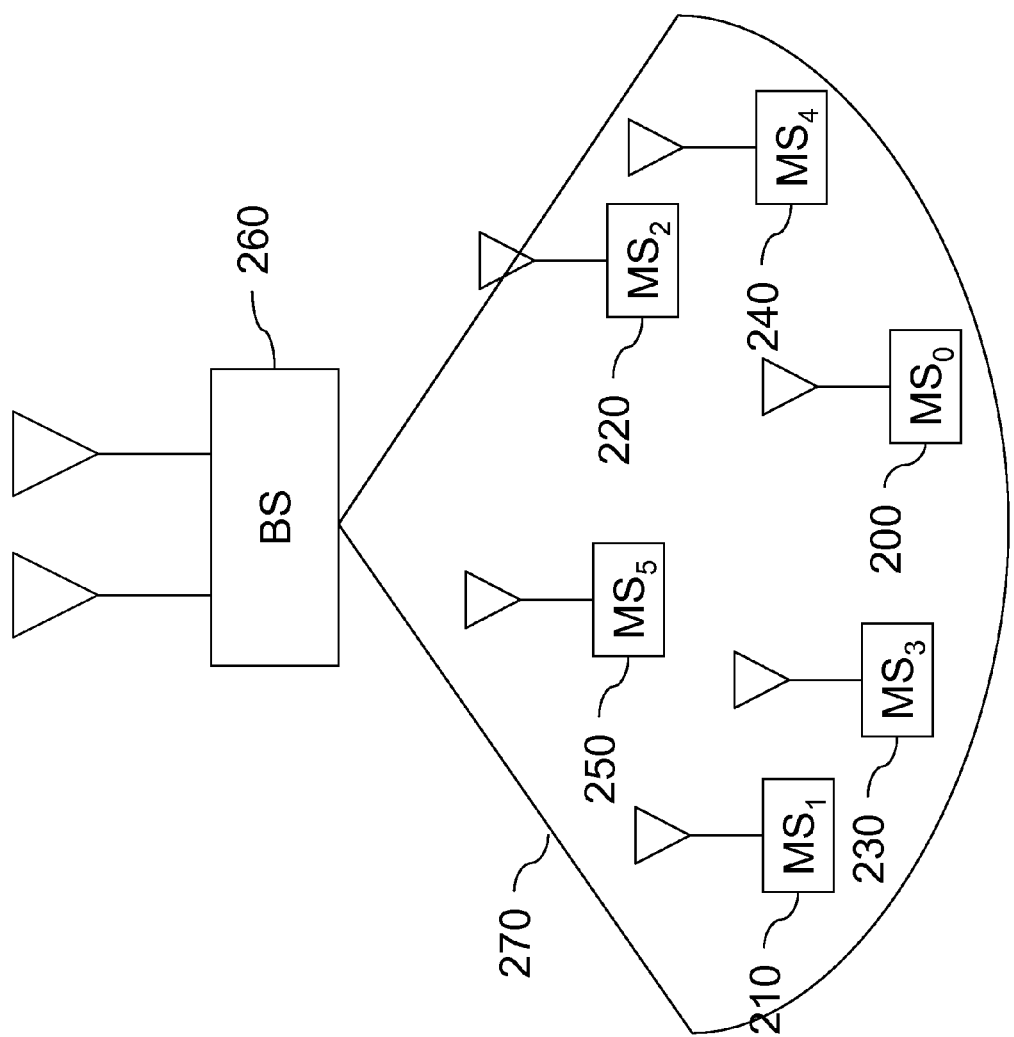
FIG. 2 illustrates a base station and several mobile stations from a wireless communications network.

FIG. 2 illustrates one base station 260 and several mobile stations from the wireless communications network of FIG. 1. The base station 260 has three coverage areas, one of which is shown as 270. The coverage area is sometime referred to as a sector. Six mobile stations 200, 210, 220, 230, 240, 250 are in the shown coverage area. The base station 260 typically assigns each mobile station one or more connection identifiers (CID) (or another similar identifier) to facilitate time-frequency resource assignment. The CID assignment can be transmitted from the base station to the mobile station on a control channel, can be permanently stored at the mobile station, or derived based on a mobile station or base station parameter.

Figure 3:
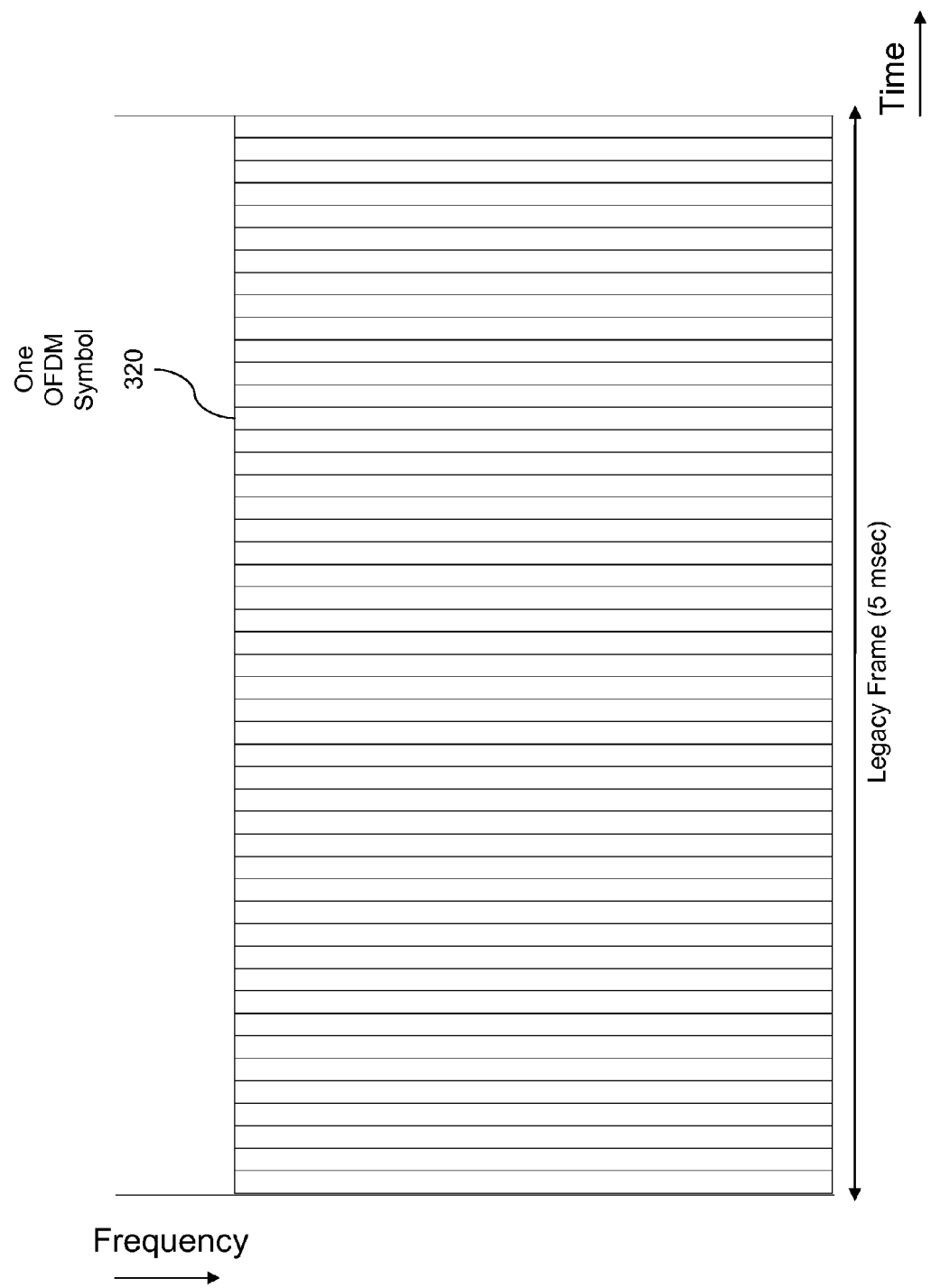
FIG. 3-4 illustrates an example set of OFDMA time-frequency radio resources.

FIG. 3 illustrates an example set of OFDMA time-frequency radio resources. In OFDMA systems, the time-frequency resources are divided into OFDM symbols and OFDM subcarriers for allocation by the base station scheduler to the mobile stations. In an example OFDMA system, the OFDM subcarriers are approximately 10 kHz apart and the duration of each OFDM symbol is approximately 100 μsec. FIG. 3 illustrates one 5 msec frame of an OFDMA system, such as that defined by the IEEE 802.16e standard. Note that 5 msec is one frame duration and that other frame durations are possible. The term legacy frame will be used to refer to basic unit of timing in the legacy system. Similarly, mobile stations conforming to the legacy system will be denoted legacy mobile stations, whereas mobile stations conforming to the new system will be denoted new mobile stations.

Referring again to FIG. 3, in this exemplary embodiment, resources in the time domain (x-axis) are divided into 48 OFDM symbols 320. In the frequency domain (y-axis), the resources are divided into multiple subchannels (not shown), wherein the size of the subchannel depends on the subcarrier permutation scheme.

A permutation scheme is a mapping from logical subchannels to physical subcarriers. Downlink (DL) partial usage of subcarriers (PUS C), DL full usage of subcarriers (FUSC), and uplink (UL) PUSC are exemplary subcarrier permutations schemes defined in the IEEE 802.16 standard. Other permutation schemes are also defined in the IEEE 802.16 standard, so DL PUSC, DL FUSC, and UL PUSC are merely used to illustrate the invention.

For DL PUSC, there are 360 data subcarriers divided into 15 subchannels, wherein each subchannel has 24 data subcarriers. For DL PUSC, the base station must assign an even number of OFDM symbols for each subchannel. For DL FUSC, there are 384 data subcarriers divided into 8 subchannels, wherein each subchannel has 48 data subcarriers. For UL PUSC, there are 408 subcarriers (data plus pilot) divided into 17 subchannels, wherein each subchannel has 24 subcarriers (16 data plus 8 pilot). For UL PUSC, the number of OFDM symbols for each subchannel must be a multiple of 3.

Figure 4:
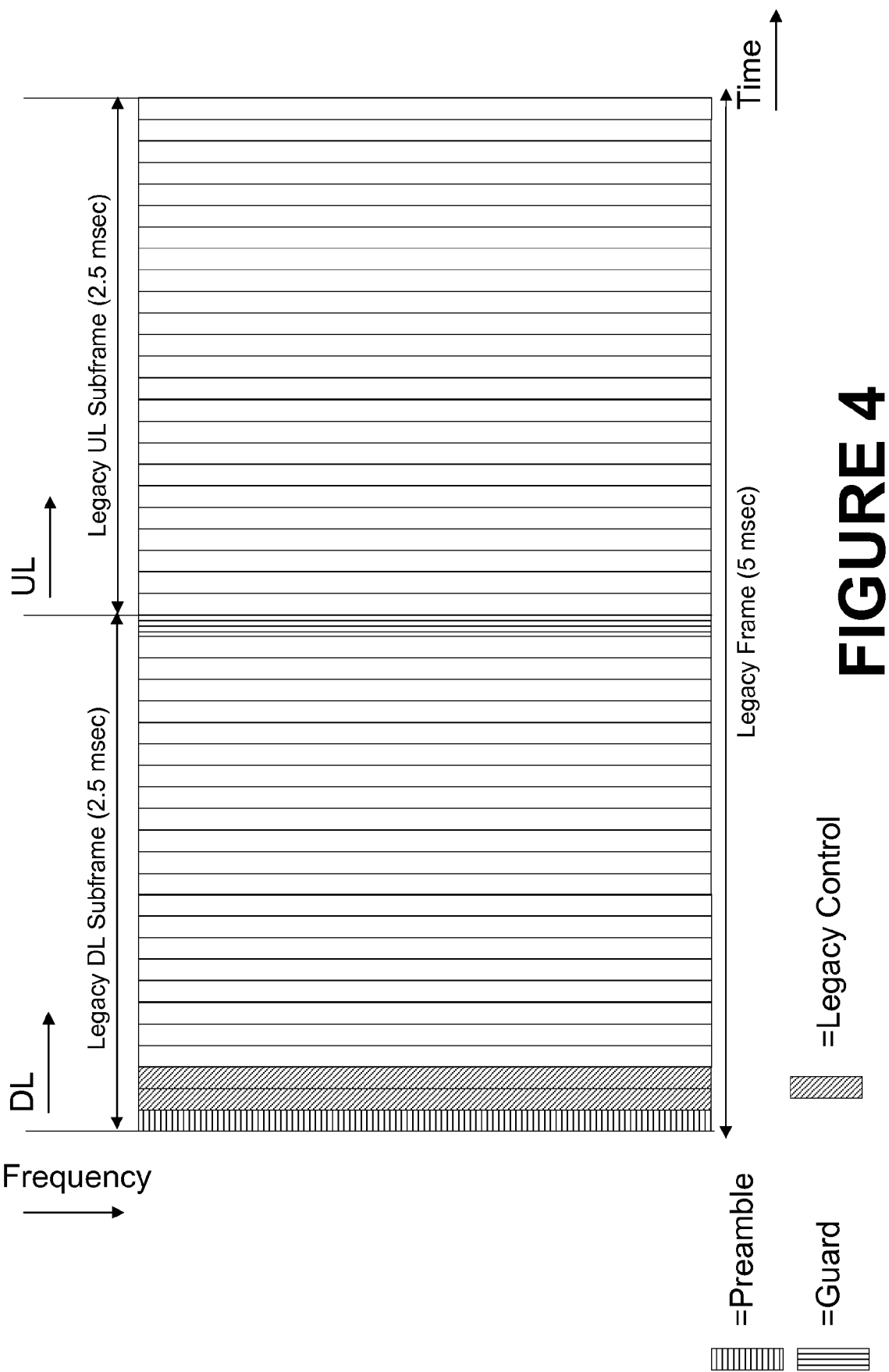

FIG. 4 illustrates the division of the legacy time domain structure of FIG. 3 into a legacy downlink subframe and a legacy uplink subframe. Referring to FIG. 4, the time-frequency resources correspond to a time division duplex (TDD) system, such as that defined by the IEEE 802.16e standard. In this exemplary embodiment, the resources in the time domain (x-axis) are divided into two equal portions; denoted as the legacy DL subframe and the legacy UL subframe. Each of the legacy DL subframe and the legacy UL subframe is comprised of 24 OFDM symbols. The first DL OFDM symbol is allocated for the preamble, which is used for timing and frequency synchronization by the mobile stations. The second and third DL OFDM symbols are used to transmit control information. The twenty-fourth DL OFDM symbol is allocated as a guard period. Note that there is also a guard period following the legacy UL subframe, which is not shown.

Figure 5:
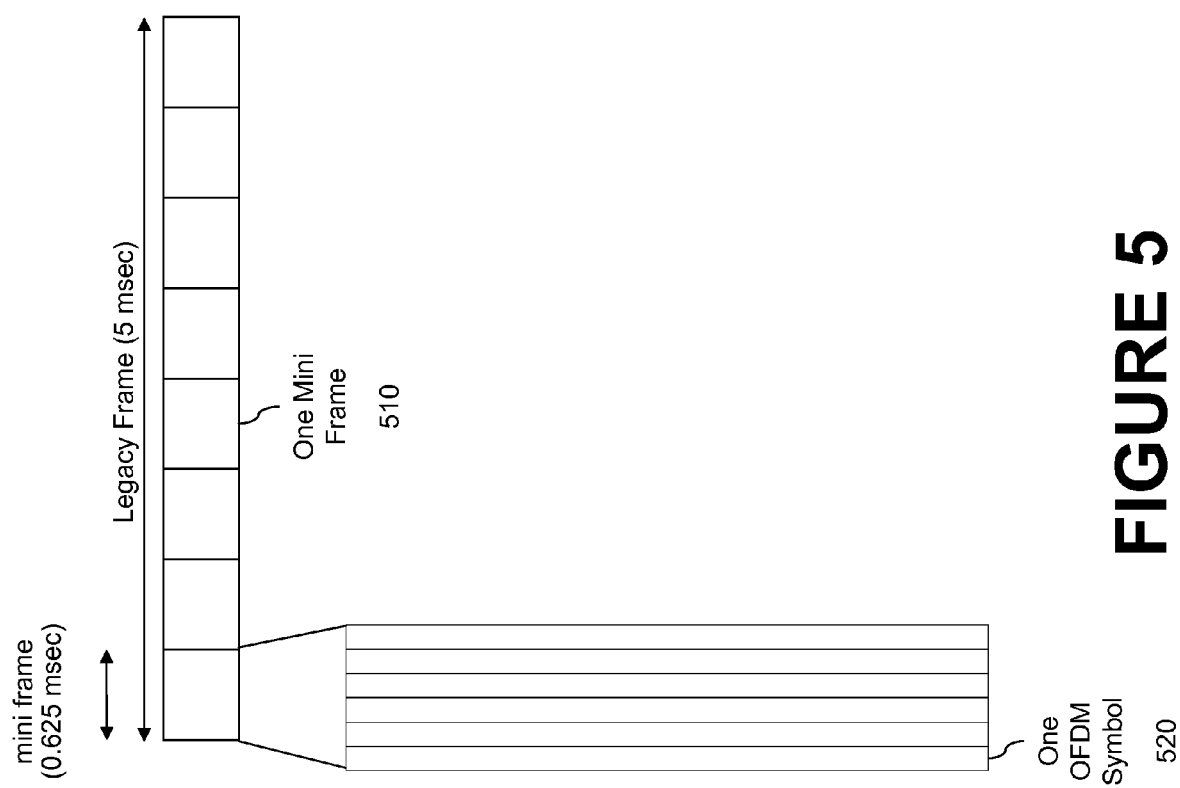
FIG. 5 illustrates the time domain structure of the legacy system and the new system.

The time domain structure of FIG. 4 only provides one H-ARQ handshaking opportunity per legacy frame. In order to provide additional H-ARQ handshaking opportunities, a new timing structure, for use by new mobile stations, is provided in FIG. 5. Referring to FIG. 5, the legacy frame of FIGS. 3-4 is divided into eight equal portions, denoted mini frames 510. Each mini frame can be designated as a downlink mini frame or an uplink mini frame and is comprised of six OFDM symbols 520. In some embodiments, one or more symbols of a subframe is punctured for use by legacy control channels. In alternate embodiments, the number of OFDM symbols in the subframe is dependent on the OFDMA parameters, such as OFDM symbol duration and cyclic prefix length. To designate whether each mini frame is a DL mini frame or an UL mini frame, the base station can transmit a length 8 bitmap to the mobile stations using a control channel, where one state of each bit corresponds to a DL mini frame and the other state of each bit corresponds to an UL mini frame. If DL mini frames occur first and there can only be one switching point between DL and UL mini frames, the base station can simply transmit an indication of the number of DL mini frames to indicate the time domain structure.

In some embodiments, each mini frame (including concatenated mini frames as will be discussed in more detail later) can have exactly one subcarrier permutation for traffic (note that the subcarrier permutation for control may be different than the subcarrier permutation for traffic). Further, in some embodiments, the time-frequency resources of each mini frame (including concatenated mini frames as will be discussed in more detail later) are represented by a channel tree. In some embodiments, each mini frame is divided into at least two groups of subcarriers, each group corresponding to exactly one subcarrier permutation.

Figure 6:
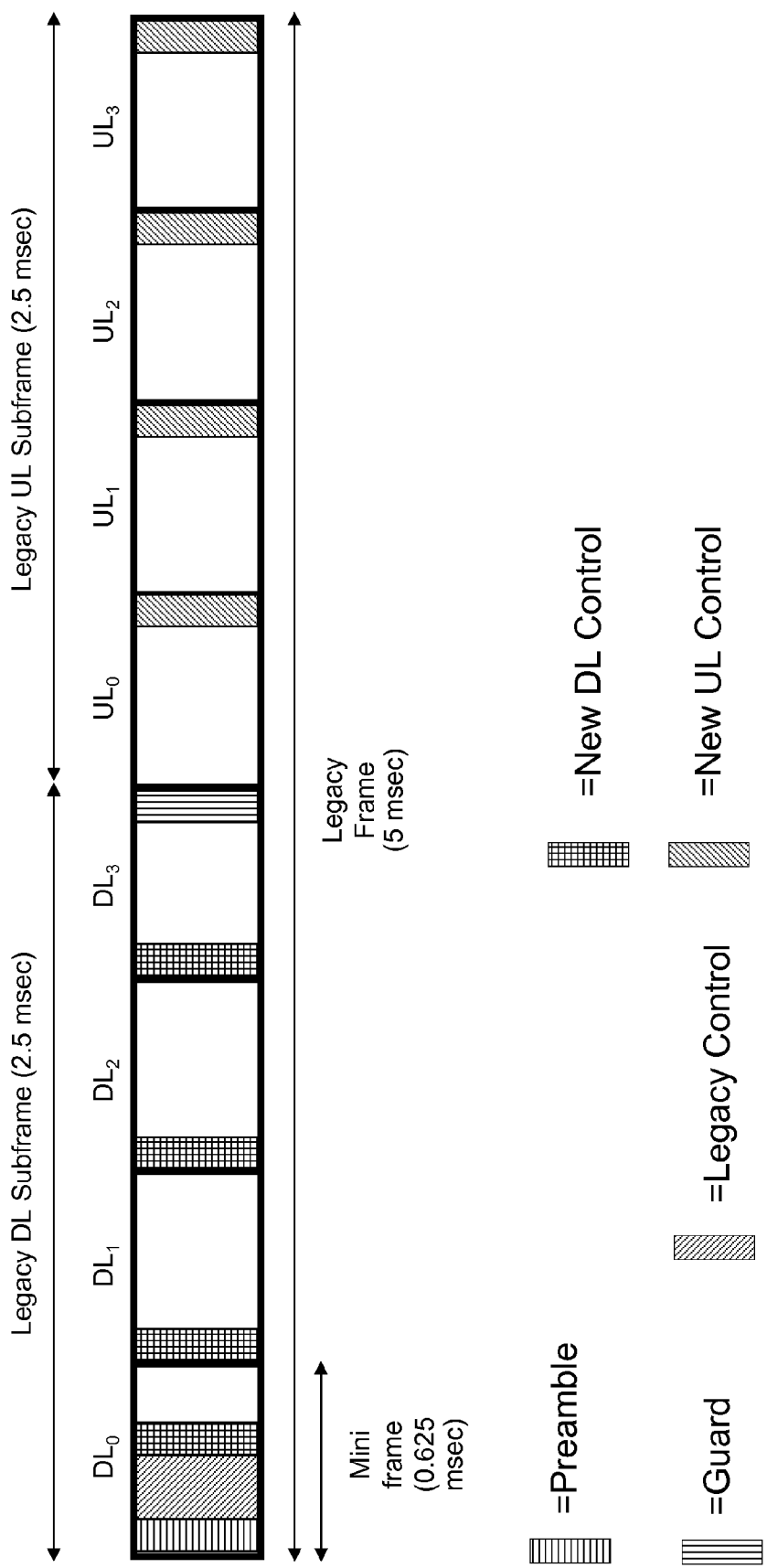
FIG. 6 illustrates the placement of control information for the new wireless communication system.

FIG. 6 illustrates the placement of control information for the new wireless communication system. Referring to FIG. 6, legacy downlink subframe is divided into four mini frames, denoted DL0, DL1, DL2, and DL3. Similarly, the legacy uplink subframe is divided into four mini frames, denoted UL0, UL1, UL2, and UL3. Within DL0, the first OFDM symbol is used for transmitting the preamble, as required for the legacy mobile stations. The second and third OFDM symbols are used to transmit control information to legacy mobile stations. Note that in some embodiments, new mobile stations also monitor the legacy control channels and can therefore be assigned time-frequency resources using the legacy control channels.

The fourth OFDM symbol is used for transmitting DL control information to new mobile stations. In DL1, DL2, and DL3, the first OFDM symbol is used for transmitting DL control information to new mobile stations. This control information can be time-frequency resource assignments, acknowledgement for uplink traffic, power control commands, and the like. In UL0, UL1, UL2, and UL3, the last OFDM symbol is used for transmitting UL control information from new mobile stations to the base station. This control information can be channel quality indication (CQI) reports, acknowledgements for downlink traffic, and the like.

Note that the new control information is drawn as occurring on one OFDM symbol. However, in some embodiments, the new control information uses a particular frequency domain resource over multiple OFDM symbols. In addition, the new control information may not require the entire OFDM symbol, in which case traffic can use those resources not used for transmitting the new control information.

Figure 7:
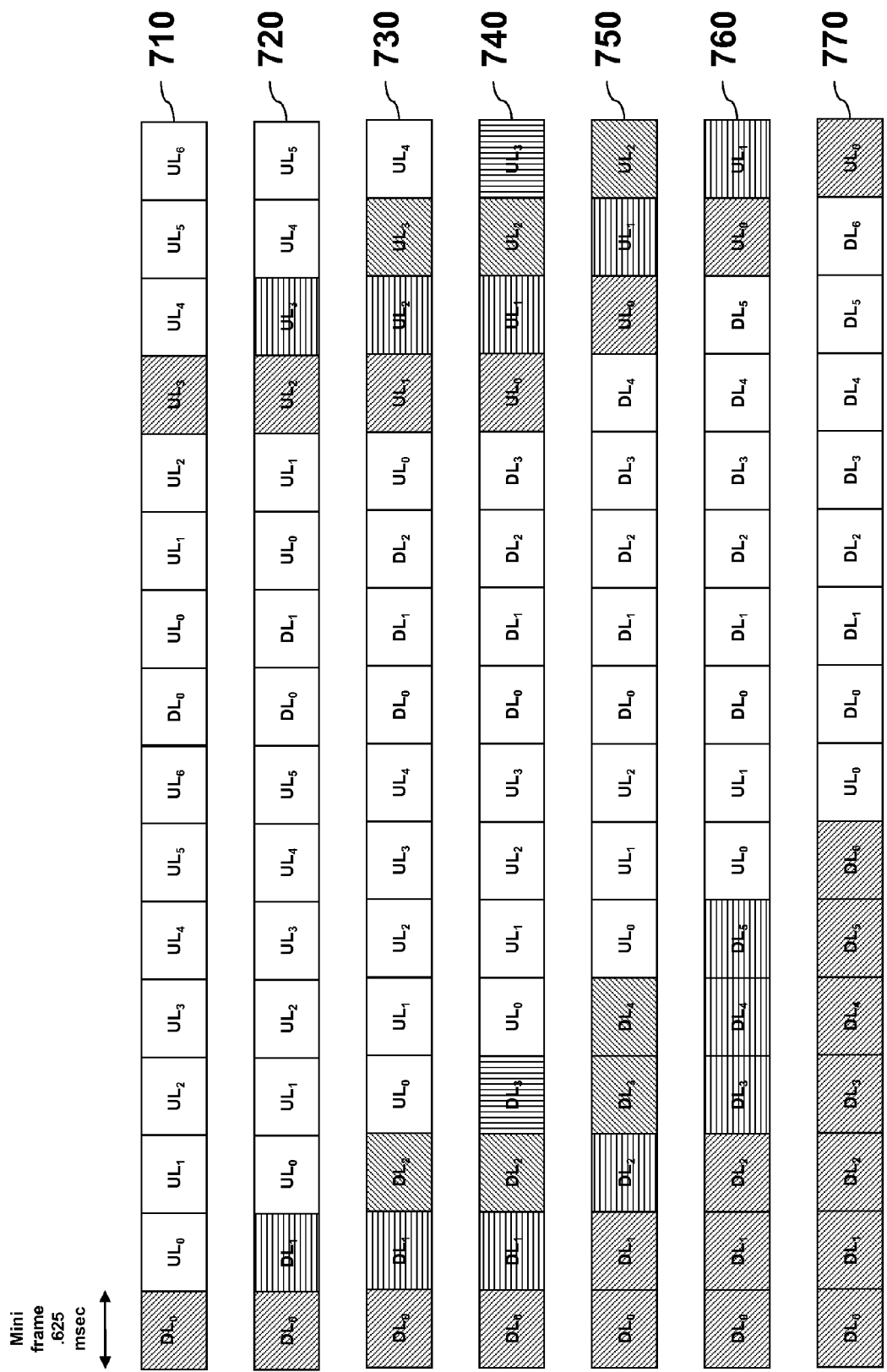
FIG. 7 illustrates the relationship between downlink traffic and uplink acknowledgments for slow retransmissions.

FIG. 7 illustrates the relationship between downlink traffic and uplink acknowledgments for slow retransmissions. With a mini frame structure, such as that of FIGS. 5-6, it is beneficial to establish a predefined timing relationship between the downlink traffic and the uplink acknowledgment for H-ARQ transmissions. In some embodiments, two timing relationships are established, denoted slow retransmissions and fast retransmissions. The base station can use fast retransmissions or slow retransmissions depending on its requirements and the capabilities of the mobile stations.

Referring to FIG. 7, for the case when there is one DL mini frame and seven UL mini frames 710, the DL traffic occurs in the first occurrence of DL0 and the UL acknowledgment occurs in the second occurrence of UL3. For the case when there are two DL mini frames and six UL mini frames 720, if the DL traffic occurs in the first occurrence of DL0, the UL acknowledgment occurs in second occurrence of UL2, and if the DL traffic occurs in first occurrence of DL1, the UL acknowledgment occurs in the second occurrence of UL3. Similar relationships exist for the remaining time domain structures 730-770 and are indicated in the figure. For some cases, such as the case where there are 7 DL mini frames and 1 UL mini frames 770, the acknowledgements for multiple DL mini frames occur in the same UL mini frame.

Figure 8:
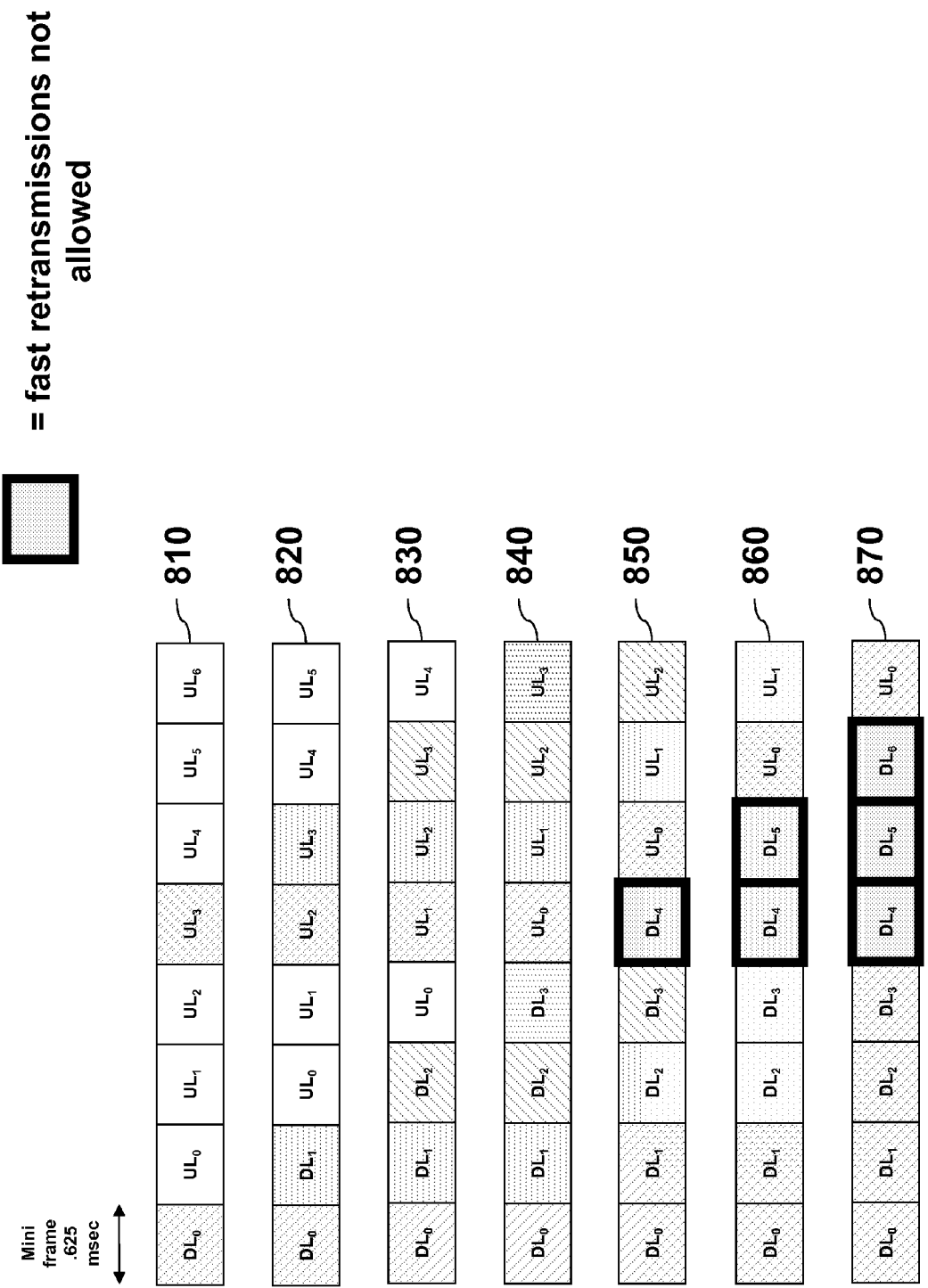
FIG. 8 illustrates the relationship between downlink traffic and uplink acknowledgments for fast retransmissions.

FIG. 8 illustrates the relationship between downlink traffic and uplink acknowledgments for fast retransmissions. Referring to FIG. 8, for the case when there is one DL mini frame and seven UL mini frames 810, the DL traffic occurs in the first occurrence of DL0 and the UL acknowledgment occurs in the first occurrence of UL3. For the case when there are two DL mini frames and six UL mini frames 820, if the DL traffic occurs in the first occurrence of DL0, the UL acknowledgement occurs in first occurrence of UL2, and if the DL traffic occurs in first occurrence of DL1, the UL acknowledgment occurs in the first occurrence of UL3. Similar relationships exist for the remaining time domain structures 830-870 and are indicated in the figure. For some time domain structures 850-870, fast retransmissions for assignments in certain mini frames are not allowed, since there isn't sufficient time for the mobile station to process the packet. In these cases, as indicated by the gray shading, the slow retransmission timing of FIG. 7 must be used for H-ARQ transmissions.

Figure 9:
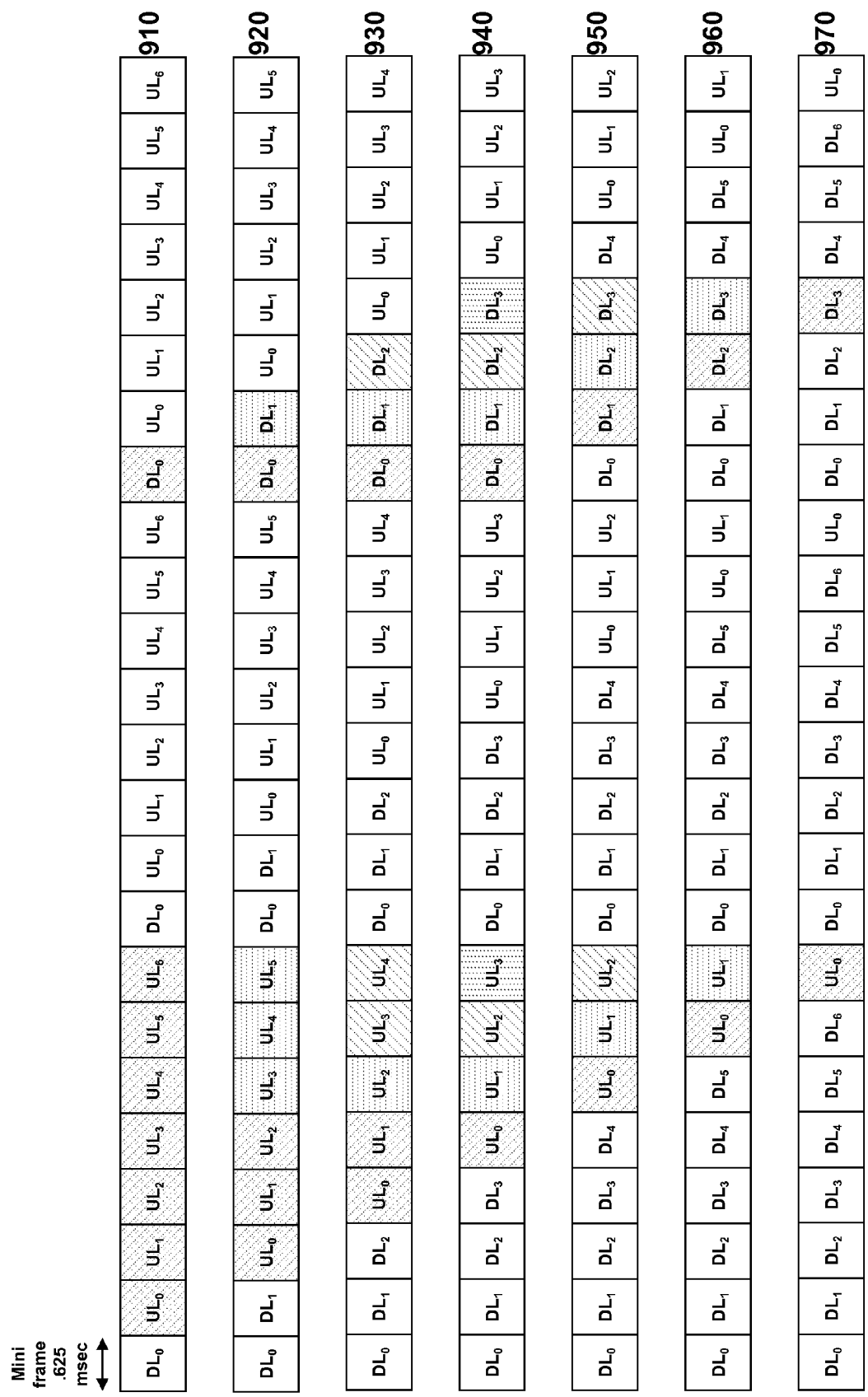
FIG. 9 illustrates the relationship between downlink traffic and uplink acknowledgments for slow retransmissions.

FIG. 9 illustrates the relationship between downlink traffic and uplink acknowledgments for slow retransmissions. With a mini frame structure, such as that of FIGS. 5-6, it is beneficial to establish a predefined timing relationship between the uplink traffic and the downlink acknowledgment for H-ARQ transmissions. In some embodiments, two timing relationships are established, denoted slow retransmissions and fast retransmissions. The mobile station can use fast retransmissions or slow retransmissions depending on its requirements, and control channel messages received from the base station.

Referring to FIG. 9, for the case when there is one UL mini frame and seven DL mini frames 970, the UL traffic occurs in the first occurrence of UL0 and the DL acknowledgment occurs in the third occurrence of DL3 (the second occurrence of DL3 after the first occurrence of UL0). For the case when there are two UL mini frames and six DL mini frames 960, if the UL traffic occurs in the first occurrence of UL0, the DL acknowledgement occurs in third occurrence of DL2, and if the UL traffic occurs in first occurrence of UL1, the DL acknowledgment occurs in the third occurrence of DL3. Similar relationships exist for the remaining time domain structures 910-970 and are indicated by like shading. For some cases, such as the case where there are 7 UL mini frames and 1 DL mini frames 910, the acknowledgements for multiple UL mini frames occur in the same DL mini frame.

Figure 10:
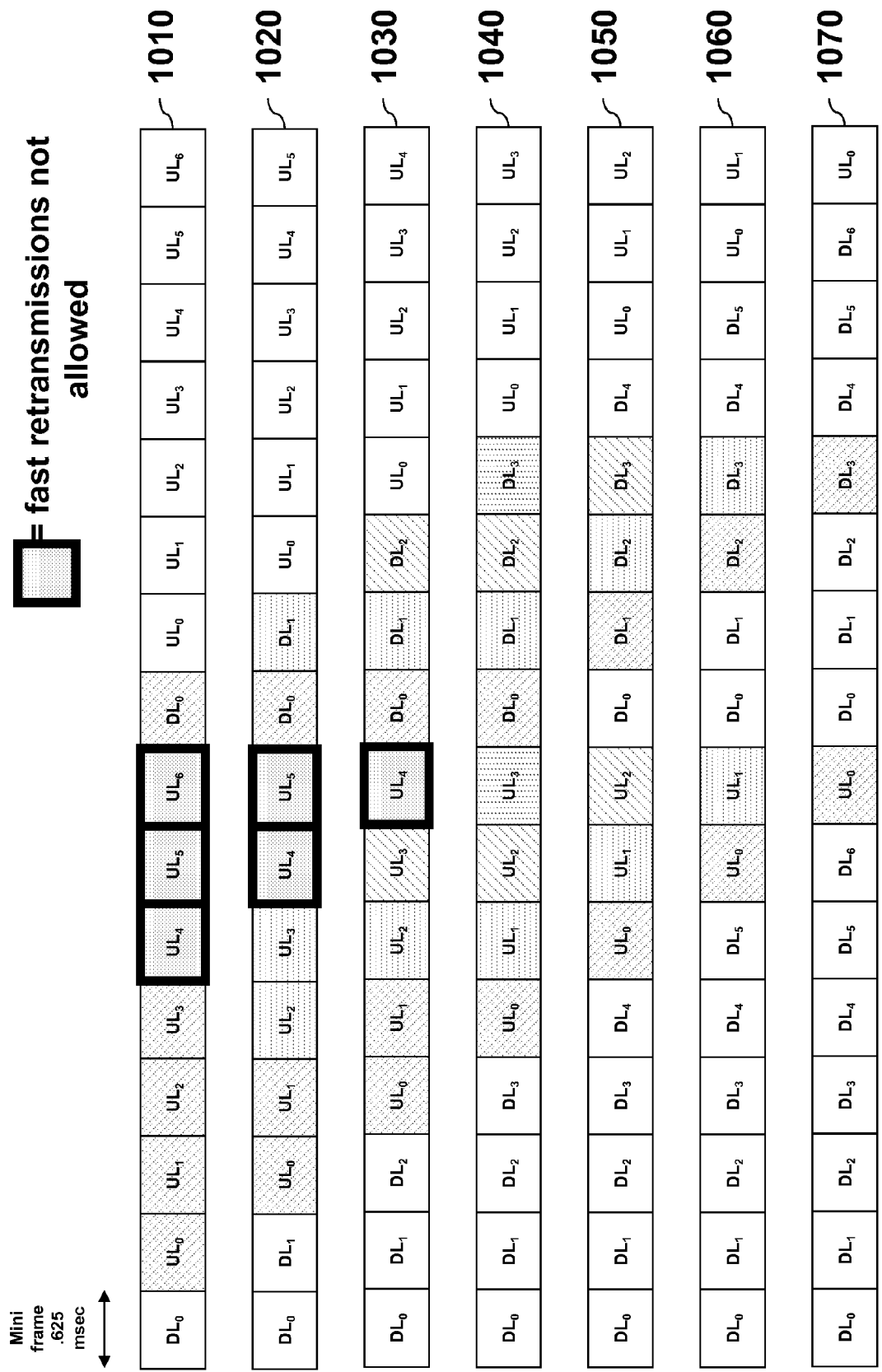
FIG. 10 illustrates the relationship between downlink traffic and uplink acknowledgments for fast retransmissions.

FIG. 10 illustrates the relationship between downlink traffic and uplink acknowledgments for fast retransmissions. Referring to FIG. 10, for the case when there is one UL mini frame and seven DL mini frames 1070, the UL traffic occurs in the first occurrence of UL0 and the DL acknowledgment occurs in the second occurrence of DL3. For the case when there are two UL mini frames and six DL mini frames 1060, if the UL traffic occurs in the first occurrence of UL0, the DL acknowledgement occurs in second occurrence of DL2, and if the UL traffic occurs in first occurrence of UL1, the DL acknowledgment occurs in the second occurrence of DL3. Similar relationships exist for the remaining time domain structures 1010-1050 and are indicated in the figure. For some time domain structures 1010-1030, fast retransmissions for assignments in certain mini frames are not allowed, since there isn't sufficient time for the base station to process the packet. In these cases, the slow retransmission timing of FIG. 9 must be used for H-ARQ transmissions.

The relationship between the traffic subframe and the acknowledgement subframe can be represented by a lookup table, an equation, and the like.

Figure 11:
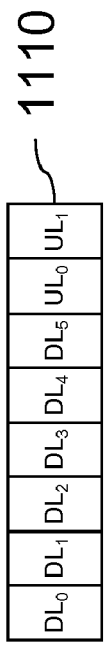
FIG. 11 illustrates an example message for concatenating mini frames.
Figure 11:
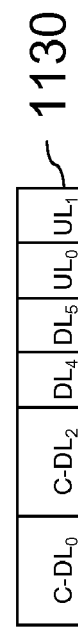

In order to reduce control channel overhead, in some embodiments, it may not be desirable to transmit control in each mini frame. FIG. 11 illustrates an example message for concatenating mini frames as a means of reducing control channel overhead. Consider that the base station has transmitted an indication of the time domain structure to the mobile stations and that this time domain structure has six DL mini frames and two UL mini frames 1110. To indicate which mini frames are concatenated, the base station transmits concatenation bitmap 1120, where the most significant bit in the concatenation bitmap 1120 corresponds to the left most mini frame, the second most significant bit in the concatenation bitmap 1120 corresponds to the second left most mini frame, etc. A '1' in the concatenation bitmap 1120 indicates that the corresponding mini frame is concatenated with the mini frame to its left to form a concatenated mini frame. Note that more than two mini frames can be concatenated in each concatenated mini frame.

In the example of FIG. 11, the second left most mini frame, DL1, is concatenated with the mini frame to its left, DL0, to form a concatenated mini frame, denoted C-DL0, and the fourth left most mini frame, DL3 is concatenated with the mini frame to its left, DL2, to form a concatenated mini frame, denoted C-DL2. Based on this information, the mobile station knows when to expect control information. In some embodiments, the base station indicates exactly one subcarrier permutation for traffic in each mini frame (or concatenated mini frame).

Figure 12:
FIG. 12 is a flow chart for base station operation.

FIG. 12 is a flow chart for base station operation. At step 1210, the base station divides a frame into at least three mini frames, wherein the mini frames repeat periodically. At step 1220, the base station designates at least two of the at least three mini frames as downlink mini frames and designates the concatenation of all downlink mini frames as the downlink subframe. At step 1230, the base station designates at least one of the at least three mini frames as an uplink mini frame and designates the concatenation of all uplink mini frames as the uplink subframe.

At step 1240, the base station designates a legacy control region, wherein the legacy control region occurs in each occurrence of the downlink subframe. In some embodiments, the base station transmits an indication of the location of the legacy control region. In other embodiments, the location of the legacy control region is known at the mobile stations. For example, the legacy control region can also occur immediately following the preamble.

At step 1250, the base station designates a new downlink control region in at least one of the at least two downlink mini frames. At step 1260, the base station designates a new uplink control region in at least one of the at least one uplink mini frames. In some embodiments, the base station transmits an indication of the location of the new control regions to the mobile stations. In other embodiments, the location of the new control region is known at the mobile stations. For example, the new downlink control region can occur immediately following the preamble and the legacy control region in the first downlink mini frame of the downlink subframe and can occur in the first OFDM symbol for subsequent mini downlink frames of the downlink subframe.

At step 1270, the base station transmits an indication of the designated downlink and designated uplink mini frames to the new mobile stations. This indication can be a bitmap, wherein each bit corresponds to a mini frame and one value of each bit indicates a downlink mini frame, while the other value of each bit indicates an uplink mini frame. Alternatively, this indication can be the number of downlink mini frames. In some embodiments, the base station also transmits an indicating of exactly one downlink subcarrier permutation for traffic for each of the at least two downlink mini frames and transmits an indicating of exactly one uplink subcarrier permutation for traffic for each of the at least one uplink mini frames.

In some embodiments, the subcarrier permutation for control channels may be different than the subcarrier permutation for traffic channels in which case the new downlink control region has a subcarrier permutation which is different from the indicated downlink subcarrier permutation.

At step 1280, the base station transmits control information to the legacy mobile stations in the legacy control region. At step 1290, the base station transmits control information to new mobile stations in the new downlink control region. The control information can be time-frequency resource assignments, power control commands, channel quality indication (CQI) reports, acknowledgment information and the like.

Figure 13:
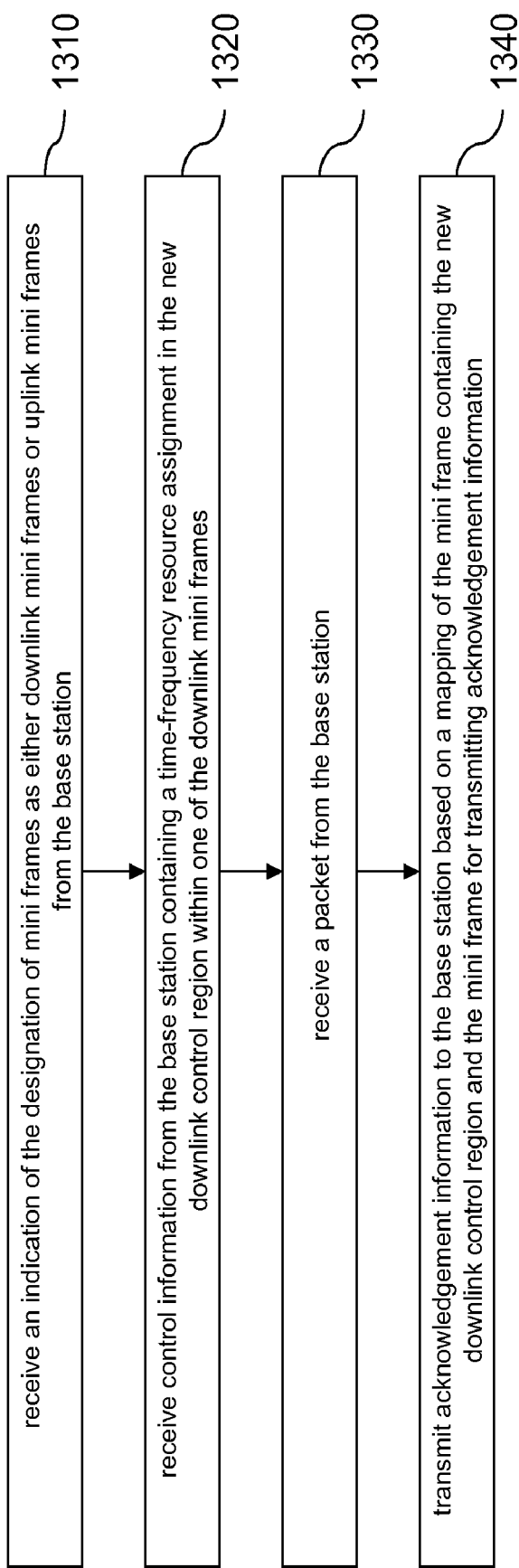
FIG. 13 is a flow chart for mobile station operation.

FIG. 13 is a flow chart for mobile station operation. At step 1310, the mobile station receives an indication of the designation of mini frames as either downlink mini frames or uplink mini frames from the base station.

At step 1320, the mobile station receives control information containing a time-frequency resource assignment from the base station in the new downlink control region within one of the downlink mini frames. At step 1330, the mobile station receives a packet from the base station. At step 1340, the mobile station transmits acknowledgement information to the base station based on a mapping of the mini frame containing the new downlink control region and the mini frame for transmitting acknowledgement information.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of transmitting control information in a wireless communications system, the method comprising:
   dividing a frame into at least three mini frames, wherein the mini frames repeat periodically;
   designating at least two of the at least three mini frames as downlink mini frames, denoting a concatenation of all downlink mini frames as a downlink subframe, wherein at least two of the downlink mini frames are concatenated to form a concatenated mini frame;
   designating at least one of the at least three mini frames as an uplink mini frame, denoting a concatenation of all uplink mini frames as an uplink subframe;
   designating a legacy control region, wherein the legacy control region occurs in each occurrence of the downlink subframe;
   designating a new downlink control region and a data region in each of at least two of the at least two downlink mini frames within the downlink subframe;
   designating a new uplink control region in at least one of the at least one uplink mini frames;
   transmitting an indication of the designated downlink and designated uplink mini frames to new mobile stations, wherein the indication is a bitmap, wherein each bit in the bitmap corresponds to one respective mini frame, and wherein a set bit indicates that the corresponding mini frame is concatenated with an adjacent mini frame;
   transmitting control information to legacy mobile stations in the legacy control region; and transmitting control information to the new mobile stations in the new downlink control region.

2. The method of claim 1, further comprising:
transmitting an indication of exactly one downlink subcarrier permutation for traffic for each of the at least two downlink mini frames; and
transmitting an indication of exactly one uplink subcarrier permutation for traffic for each of the at least one uplink mini frames.

3. The method of claim 2, wherein the new downlink control region has a subcarrier permutation that is different from the indicated downlink subcarrier permutation.

4. The method of claim 2, wherein the uplink control region has a subcarrier permutation that is different from the indicated uplink subcarrier permutation.

5. The method of claim 1, wherein a channel tree is defined within each mini frame.

6. The method of claim 1, wherein each mini frame has a length of six OFDM symbols.

7. The method of claim 1, further comprising establishing a relationship between each of the least two mini downlink frames and one of the at least one mini uplink frames, the relationship mapping downlink transmissions to uplink acknowledgments.

8. The method of claim 1, further comprising establishing a relationship between each of the at least one mini uplink frames and one of the at least two mini downlink frames, the relationship mapping uplink transmissions to downlink acknowledgments.

9. A method of communicating with a base station in a wireless communications system, the method comprising:
receiving an indication of a designation of mini frames as either downlink mini frames or uplink mini frames from the base station, wherein at least two of the downlink mini frames are concatenated to form a concatenated mini frame, wherein the indication is a bitmap, wherein each bit in the bitmap corresponds to one respective mini frame, and wherein a set bit indicates that the corresponding mini frame is concatenated with an adjacent mini frame;
receiving control information from the base station containing a time-frequency resource assignment in a new downlink control region within each of at least two of the downlink mini frames within a same downlink subframe, the each of at least two of the downlink mini frames also containing a data region;
receiving a packet from the base station; and
transmitting acknowledgement information to the base station based on a mapping of the downlink mini frames containing the new downlink control region and the uplink mini frames for transmitting acknowledgement information.

10. The method of claim 9, wherein a channel tree is defined within each mini frame.

11. The method of claim 9, wherein each mini frame has a length of six OFDM symbols.

12. A method of communicating with a mobile station in a wireless communications system, the method comprising:
transmitting an indication of a designation of mini frames as either downlink mini frames or uplink mini frames to the mobile station, wherein at least two of the downlink mini frames are concatenated to form a concatenated mini frame, wherein the indication is a bitmap, wherein each bit in the bitmap corresponds to one respective mini frame, and wherein a set bit indicates that the corresponding mini frame is concatenated with an adjacent mini frame;
transmitting control information to the mobile station, the control information containing a time-frequency resource assignment in a new downlink control region within each of at least two of the downlink mini frames within a same downlink subframe, the each of at least two of the downlink mini frames also containing a data region;
transmitting a packet to the mobile station; and
receiving acknowledgement information from the mobile station based on a mapping of the downlink mini frames containing the new downlink control region and the uplink mini frames for transmitting acknowledgement information.

13. The method of claim 12, wherein the control information is transmitted and associated acknowledgment information is received in different frames.

14. The method of claim 12, further comprising transmitting the control information in all of the downlink mini frames within the same downlink subframe.

15. The method of claim 12, wherein a channel tree is defined within each mini frame.

16. The method of claim 12, wherein each mini frame has a length of six OFDM symbols.

17. The method of claim 9, further comprising receiving the control information in all of the downlink mini frames within the same downlink subframe.

18. The method of claim 9, wherein the control information is transmitted and associated acknowledgment information is received in different frames.

* * * * *